Patented Apr. 18, 1950

2,504,806

UNITED STATES PATENT OFFICE 2,504,806

PROCESS OF PREPARING LEUCO SULFURIC ESTER DERIVATIVES OF 1:4-DIBENZOYL-AMINO-ANTHRAQUINONE

Samuel Coffey, George William Driver, and David Alexander Whyte Fairweather, Blackley, Manchester, England, assignors to Imperial Chemical Industries Limited, a corporation of Great Britain No Drawing. Application December 26, 1946, Serial No. 718,628. In Great Britain January 1, 1946

4 Claims. (Cl. 260—377)

The present invention relates to the manufacture of new dyestuffs, and in particular to the manufacture of salts of the sulphuric ester of the leuco compound corresponding with 1:4-dibenzoylaminoanthraquinone.

In British Specification No. 251,491 a process for the production of derivatives of vat dyestuffs is described according to which a vat dyestuff is suspended in a tertiary base in the presence of a metal and treated by a non-alkylated sulphuric acid chloride or a salt thereof, or fuming sulphuric acid, or sulphuric anhydride, or a salt of pyrosulphuric acid; and in British Specification No. 278,399 a modification is described in which diluents, for instance acetone or nitrobenzene, are used.

Further, in British Specification No. 288,673 it is proposed to use pyrosulphuryl chloride instead of an alkyl sulphuric acid halide, chlorosulphonic acid or other derivative of sulphur trioxide. Also in British Specification No. 274,156 processes are described in which as additional ingredients in reaction mixtures of the kind herein spoken of, there are used certain quaternary ammonium halides.

The present invention relates to improvements in the above processes whereby from a particular species of vat dyestuff, which is so intractable in relation to such treatment, as not to have yielded hitherto salts of sulphuric esters of its leuco compound, such may be obtained.

According to the invention 1:4-dibenzoylaminoanthraquinone is treated in the manner described above, but using copper or an alloy thereof with copper preponderating, as metal, and with a cuprous salt present as a reagent.

In British Specification No. 251,491 it is also said that small quantities of salts are added for the purpose of assisting the course of the reaction, and by way of illustration the use of stannous chloride is described in connexion with zinc and magnesium and certain dyestuffs, but 1:4-dibenzoylaminoanthraquinone is not mentioned, nor has it hitherto been said to give leuco-sulphuric-esters.

The invention is illustrated by the following example in which the parts are by weight.

Example

A suspension of pyridine sulphuric anhydride in pyridine is made by reacting 35 parts of sodium pyrosulphate with 100 parts of pyridine, and 4.4 parts of cuprous chloride, 6.4 parts of brass powder and 9 parts of 1:4-dibenzoylaminoanthraquinone are then added. The mixture is stirred at 42° C. for 5 hours and then poured into 1000 parts of a mixture of ice and water containing 20 parts of sodium carbonate. The suspension is filtered and the residue treated with a solution made by dissolving 20 parts of sodium sulphide crystals and 2 parts of sodium carbonate in 200 parts of water. The copper residues are filtered off, and the filtrates are vacuum distilled to remove pyridine. Salt is added to the residue in the distillation flask and the sodium salt of the leuco ester is deposited as a yellow crystalline mass. The product is suitable for dyeing and printing by the usual recipes, the red shade of the parent dyestuff being produced. Instead of the cuprous chloride used above the equivalent quantity of anhydrous cupric sulphate together with the extra brass required for its reduction to the cuprous state may be added to the suspension of pyridine-sulphuric anhydride in pyridine before the addition of the 1:4-dibenzoylaminoanthraquinone.

In the absence of the copper salt the reaction proceeds much more slowly, and a lower yield of less pure product is obtained.

We claim:

1. A process for the manufacture of the leuco sulphuric ester derivative of 1:4-dibenzoylaminoanthraquinone which comprises treating 1:4-dibenzoylaminoanthraquinone, in the presence of a cuprous salt, a tertiary base and copper, with sulphur trioxide until the leuco sulphuric ester derivative of 1:4-dibenzoylaminoanthraquinone is formed and recovering said derivative from the reaction mixture.

2. A process for the manufacture of the leuco sulphuric ester derivative of 1:4-dibenzoylaminoanthraquinone which comprises preparing a reaction mixture containing a tertiary base, sulphur trioxide, a cuprous salt and copper, adding to the mixture 1:4-dibenzoylaminoanthraquinone, stirring the mixture until the leuco sulphuric ester derivative of 1:4-dibenzoylaminoanthraquinone is formed, and recovering said derivative from the reaction mixture.

3. A process for the manufacture of the leuco sulphuric ester derivative of 1:4-dibenzoylaminoanthraquinone which comprises preparing a reaction mixture with 1:4-dibenzoylaminoanthraquinone, a cuprous salt, a tertiary base, copper and a compound which gives rise to sulphur trioxide in the reaction mixture, stirring the reaction mixture until the leuco sulphuric ester derivative of 1:4-dibenzoylaminoanthraquinone is formed, and recovering said derivative from the reaction mixture.

4. A process for the manufacture of the sodium salt of the leuco sulphuric ester derivative of 1:4-dibenzoylaminoanthraquinone which comprises preparing a reaction mixture containing pyridine sulphuric anhydride, pyridine, a cuprous salt, copper and 1:4-dibenzoylaminoanthraquinone, stirring the reaction mixture at about 42° C. until the leuco sulphuric ester derivative of 1:4-dibenzoylaminoanthraquinone is formed, adding the reaction mixture to an aqueous solution of sodium alkali to convert said derivative to the sodium salt, and recovering the sodium salt of said derivative from said solution.

SAMUEL COFFEY.
GEORGE WILLIAM DRIVER.
DAVID ALEXANDER WHYTE FAIRWEATHER.

REFERENCES CITED

The following references are of record in the file of this patent:

UNITED STATES PATENTS

| Number | Name | Date |
|---|---|---|
| 957,042 | Deinet | May 3, 1910 |
| 1,776,932 | Shepherdson et al. | Sept. 30, 1930 |
| 1,949,299 | Fairweather | Feb. 27, 1934 |
| 1,954,702 | Kern | Apr. 10, 1934 |
| 2,388,285 | Ratti et al. | Nov. 6, 1945 |

FOREIGN PATENTS

| Number | Country | Date |
|---|---|---|
| 247,787 | Great Britain | Feb. 11, 1926 |
| 251,491 | Great Britain | May 3, 1926 |

OTHER REFERENCES

Fox: "Vat Dyestuffs and Vat Dyeing" (1948), pp. 28–29.